INVENTOR.
Charles A. Sauer
BY Earl D. Ayers
AGENT 3,337,054
FILTER APPARATUS
Charles A. Sauer, Belleville, Ill., assignor to The Dow Chemical Company, Midland, Mich., a corporation of Delaware
Filed Mar. 3, 1965, Ser. No. 436,879
6 Claims. (Cl. 210—266)

This invention relates to apparatus for filtering molten light metal and particularly to filter apparatus for use in connection with the continuous casting of billets of magnesium or magnesium alloys.

In connection with casting operations, substantial quantities of light metal products, made of magnesium alloys, for example, are down graded or rejected due to the presence of flux, oxides or other inclusions in the casting.

While efforts have been made in the past to develop filters for removing such inclusions, such filters have not in general been suitable for use in continuous casting operations for one or more of several reasons.

Most of such filters have been gravity filters which provide relatively low flow rates unless they are large in size. Large size results in problems in heating and operating the filters in an economical manner.

The filters have, for the most part, been incapable of removing enough inclusions to provide alloys of sufficient purity for use in specialized applications such as photoengraving plates or battery anodes, for example.

Other problems have involved initial high costs of making filters or the short useful life of the filter for example.

Accordingly, a principal object of this invention is to provide an improved filter apparatus for use in filtering light metal alloys, particularly magnesium alloys.

Another object of this invention is to provide an improved filter apparatus which is adapted for use in connection with the continuous casting of light metal alloys.

A further object of this invention is to provide an improved closed system, pressure type filter which is suitable for use with magnesium alloys.

In accordance with this invention there is provided filter apparatus comprising a closed housing e.g., cylindrical, having a pair of spaced apart divider plates extending across it from side to side to form three compartments within the housing. Each of the divider plates have an array of small bores therein.

Input to the apparatus is made to the central part of the bottom or plenum chamber, with the input tube extending above the bottom of the chamber.

A filter chamber containing preferably layered pieces of oxide lies between the two divider plates.

An elutriation chamber is the top chamber, and has an output tube extending therein. The output tube extends downwardly and protrudes from the lower part of the apparatus. A baffle plate, coupled to the end of the output tube which is in the elutriation chamber, prevents flow of the metal in the direct path between the bottom of the elutriation chamber and the output tube.

The invention, as well as additional objects and advantages thereof, will best be understood when the following detailed description is read in connection with the accompanying drawings, in which.

Figure 1:
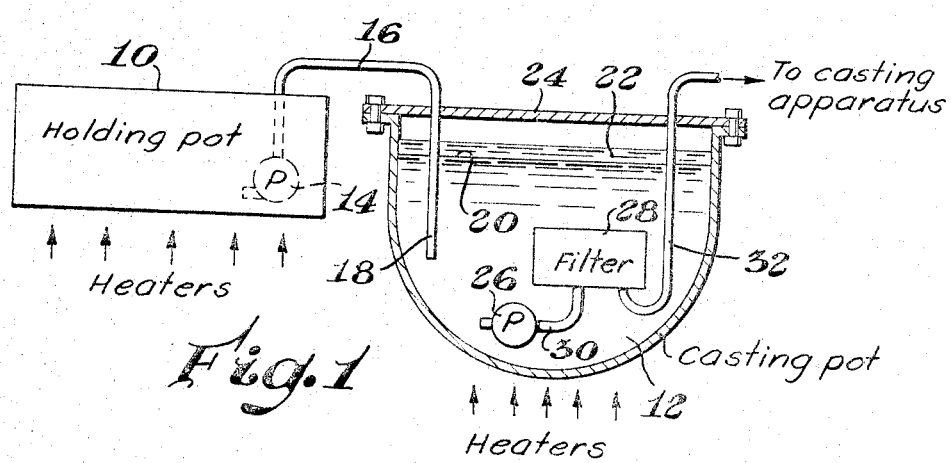
FIG. 1 is a diagrammatical view showing the apparatus of this invention used in a casting operation.

Referring to the drawings, and particularly to FIG. 1 there is shown equipment used in casting operations including a molten metal holding pot 10 which is coupled to a casting pot 12 by means of a submerged pump 14 and a tubular molten metal transfer line 16 whose end 18 is usually disposed below the level 20 at which molten metal is maintained in the casting pot 12.

The molten metal in the casting pot 12 is covered by a flux layer 22, as is common in such operations. A heat retaining cover 24 may be disposed on the top of the pot 12.

Within the pot 12 and submerged well below the top of the molten metal in the pot are a pump 26, a filter 28, a conduit 30 coupling the pump 26 to the filter 28, and a conduit 32 which is coupled from the output of the filter to casting apparatus (not shown) such as a direct chill casting machine, for example.

Figure 3:
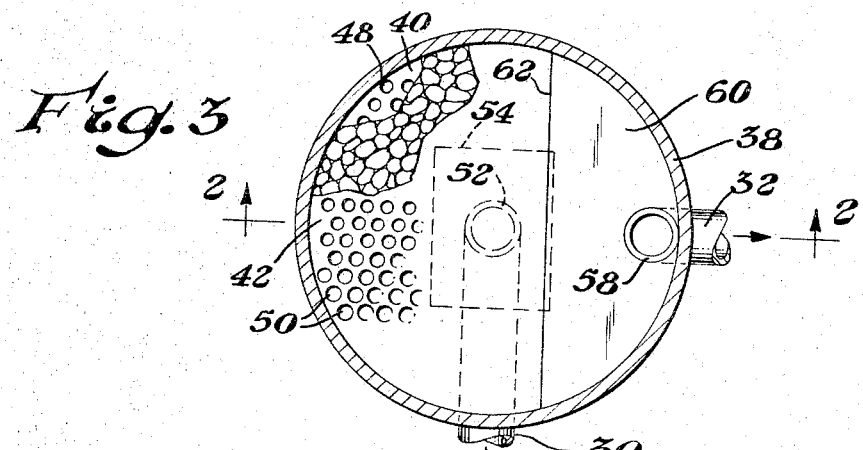
FIG. 3 is a view taken along the line 3—3 of FIG. 2.
Figure 2:
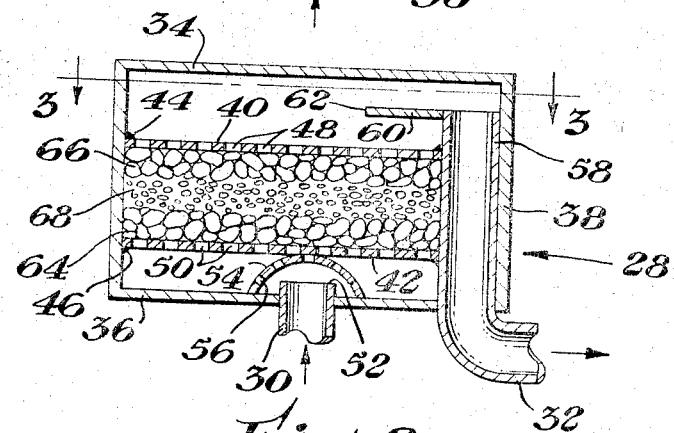
FIG. 2 is a side elevational view, in section, of filter apparatus in accordance with this invention.

The filter 28 is shown in detail in FIGS. 2 and 3. Referring to those figures, the filter 28 comprises a cylindrical housing having end walls 34, 36 and side walls 38 which define a closed vessel. A pair of spaced apart disc-like plates 40, 42 extend across the housing, dividing the housing into three compartments. The plates 40, 42 are secured to the side walls 38 by tack welds, for example, as indicated by the fillets 44, 46. Each of the divider plates 40, 42 has an array of small bores 48, 50, respectively, extending therethrough. The bores 48, 50 are disposed in a pattern such that they are distributed more or less uniformly across the plates and are of such number and size that substantial amounts of molten metal may flow through the plates without excessive pressure drop and filter bed particles adjacent to the plate will not pass through the bores.

The inlet conduit 30 enters the housing through the bottom end wall 36 and its end 52 extends above (usually about ½ to 1 inch) the top surface of the wall 36.

A dispersing element 54, usually arcuate in transverse cross sectional configuration and having length and width very substantially in excess of the diameter of the end 52 of the conduit 30, is disposed over and spaced from the end 52 of the conduit 30. The concave surface of the dispersing element 54 faces downwardly and the convex surface bears against and acts as a support for the plate 42.

The dispersing element 54 has an array of bores 56 extending therethrough, the bores 56 being distributed more or less uniformly over the surface of the element.

The outlet conduit 32 also enters the housing through the bottom end wall 36 near the side wall 38 and extends upwardly through the divider plates 42, 40. The upper end 58 of the outlet conduit 32 is disposed above the plate 40, usually by a distance of at least 1 or 2 inches.

A baffle plate 60 extends outwardly from the upper end 58 of the outlet conduit 32. The distance between the outer edge 62 of the baffle plate 60 and the end 58 of the conduit 32 is at least one and preferably two or more times the diameter of the conduit 32 at its end 58.

The baffle plate 60 is coupled to the upper end 58 of the conduit 32 around the entire periphery of the end 58 (except where the end 58 abuts against the side wall 38).

The space between the divider plates 40, 42 contains layers of aluminum oxide. Usually, as shown, a layer 64 of coarse particles is adjacent to the plate 42. A layer 66 of coarse particles is adjacent to the plate 40, and a layer 68 of fine particles is disposed between the layers 64, 66.

In operation, molten metal is pumped from the holding pot 10 through the line 16 and into the casting pot 12. The molten metal is then pumped from the casting pot 12 as needed, through the filter 28, to casting apparatus (not shown).

As is well known, molten light metal alloys (e.g. magnesium alloys) tend to have flux, oxides and other inclusions therein to a greater or lesser degree. Such inclusions frequently are present in amounts which cause cast alloys to be rejected as unsuited for uses which require an alloy of high purity.

As the molten metal enters the filter 28 through the tube or line 30, the metal is dispersed by means of the plate 54 to assure that the major part of the metal doesn't tend to flow through one particular part of the filter bed.

The bores 48 and 50 in the plates 40, 42, respectively are small enough to prevent the larger filter particles from passing therethrough and in sufficient number to permit molten metal to flow through the filter without an excessive pressure drop.

As the molten metal passes through the filter bed and thence through the elutriation chamber, most of the inclusions are removed from the metal. The exact manner or theory of operation of how the filter operates is not something on which those skilled in the art agree. Various persons have advanced different theories as to why this particular filter structure functions so well. The only thing agreed on by everyone is that the filter works very well.

The outlet tube or conduit 32 is taken from the bottom of the filter housing so that the conduit has a long path through molten metal before it leaves the pot 12. Such a structure is needed because if the metal level in the pot 12 was low and the conduit 32 left the filter at the upper end of the housing, the possibility exists that the filter might cool (conduction back through the conduit) and "freeze" metal in it. It has been found difficult to heat a filter in which metal has frozen to an extent such that free flow through the filter is resumed.

In one filter in accordance with this invention the housing diameter is 24 inches, housing height 7 inches, plenum chamber depth 1½ inches, filter chamber depth 3 inches and elutriation chamber depth 2½ inches. The bores in the plates 40, 42 are ⅛ inch in diameter. The filter material in the upper and lower layers is chunks which are between ¼ and ¾ inch in maximum dimension. The filter material (aluminum oxide in all layers) in the middle layer is chunks varying in maximum dimension between ⅛ and ¼ inch.

The input and output conduits 30, 32 have an inside diameter of 1 inch, although larger diameter conduits are very commonly used.

The baffle plate extends about ⅓ of the diameter of the housing.

Filters in which the aluminum oxide particles are smaller than the example cited above have been used. Corresponding reduction in the size of the bores in the plates 40, 42 must be made in such cases.

While a filter having a housing diameter of 24 inches has been described, filters 12 inches and 16 inches in diameter are often used. Likewise, filters which are rectangular in transverse cross sectional configuration rather than circular are practical.

The input conduit 30 extends between ½ inch and 1 inch above the bottom plate of the housing.

The housing, conduits and plates of the filter are commonly made of steel. However, if the filter were to be used to filter molten aluminum, the steel would desirably be faced with a surface which does not react appreciably with aluminum.

What is claimed is:
1. Apparatus for filtering molten alloys of light metal comprising:
 (A) an enclosed housing having a top, bottom and side walls,
 (B) a pair of spaced apart plate-like partitions, said partitions extending between said side walls and each being spaced from its adjacent end of said housing, thereby dividing the interior of said housing into three compartments,
 (C) each of said plate-like partitions having an array of bores extending therethrough,
 (D) a filter bed composed of aluminum oxide particles, the size of the particles disposed adjacent to said partitions being such that the particles do not pass through the array of bores in said partitions,
 (E) an input conduit, said input conduit extending through said bottom at least one-half inch,
 (F) dispersing and support means, said dispersing and support means including an apertured plate-like member which is disposed over and spaced from said input conduit and which contacts the partition which is closest to said bottom,
 (G) an output conduit, said output conduit being disposed adjacent to said side walls and extending through said bottom and said pair of partitions, said output conduit having an end which is disposed adjacent to but spaced from said top and is above the partition closest to said top,
 (H) and a baffle plate, said baffle plate extending from the end of said output conduit a distance such that metal flowing from said partitions passes past said baffle plate for a distance equal to at least ⅓ of the average of the combined length and width of said housing.

2. Filter apparatus in accordance with claim 1, wherein said top, bottom and partitions are each disposed parallel to one another.

3. Filter apparatus in accordance with claim 1, wherein said filter bed comprises a layer of large particles adjacent to each partition and at least one other layer of particles sandwiched therebetween.

4. Filter apparatus in accordance with claim 1, wherein said baffle plate is parallel with said partitions and is disposed at least one inch above the nearest partition.

5. Filter apparatus in accordance with claim 1, wherein the compartment adjacent to said bottom is approximately half the depth of the compartment between said partitions and the compartment adjacent to said top has a depth of between one-half to one times the depth of the compartment between said pair of partitions.

6. Filter apparatus in accordance with claim 1, wherein said input conduit enters said housing near to the center of said bottom.

No references cited.

SAMIH N. ZAHARNA, *Primary Examiner.*